(12) United States Patent
Grigor

(10) Patent No.: US 6,781,587 B2
(45) Date of Patent: Aug. 24, 2004

(54) VIDEO GRAPHIC INTERFACE DEVICE AND METHOD FOR PORTRAIT AND LANDSCAPE IMAGE DISPLAY MODES

(75) Inventor: Gordon F. Grigor, Toronto (CA)

(73) Assignee: ATI International SRL, West Indies (BB)

(*) Notice: Subject to any disclaimer, the term of this patent is extended or adjusted under 35 U.S.C. 154(b) by 347 days.

(21) Appl. No.: 09/834,661

(22) Filed: Apr. 13, 2001

(65) Prior Publication Data

US 2002/0149594 A1 Oct. 17, 2002

(51) Int. Cl.$^7$ .............................................. G06F 13/28
(52) U.S. Cl. ........................ 345/533; 345/649; 345/502
(58) Field of Search ................................ 345/501–506, 345/519–20, 522, 530–574, 649; 382/284, 297

(56) References Cited

U.S. PATENT DOCUMENTS

| | | | | |
|---|---|---|---|---|
| 5,602,943 A | * | 2/1997 | Velho et al. ................ | 382/266 |
| 6,072,476 A | * | 6/2000 | Harada et al. .............. | 345/204 |
| 6,232,932 B1 | * | 5/2001 | Thorner ...................... | 345/1.3 |
| 6,323,874 B1 | * | 11/2001 | Gossett ....................... | 345/619 |
| 6,411,396 B1 | * | 6/2002 | Benson et al. ............. | 358/1.18 |

* cited by examiner

Primary Examiner—Matthew C. Bella
Assistant Examiner—Allen Quillen
(74) Attorney, Agent, or Firm—Volpe and Koenig, P.C.

(57) ABSTRACT

A graphic interface device produces a video signal for a display such that the user may select between landscape and portrait image display modes. The graphic interface device has a pixel data memory array from which a video output signal is derived. A primary graphics engine renders graphics in a landscape orientation in conjunction with a frame buffer. The primary landscape graphics engine stores rendered graphics to the pixel data memory array and also copies selected graphics in data blocks within the frame buffer called surfaces. In order to provide other display modes to display images in different physical orientations, a mode control is provided in conjunction with a rotated pixel data array buffer to facilitate the rendering of portrait oriented graphics by the primary landscape graphics engine. In addition, to facilitate the efficiency and speed of rendering portrait oriented graphics, a secondary portrait graphics engine is provided. To enable the secondary portrait graphics engine to access the frame buffer directly, a rotated surface buffer is used by the primary landscape engine to store copies of data written to the rotated data array buffer in the frame buffer in a portrait orientation.

11 Claims, 4 Drawing Sheets

FIG. 4a

| P1,1 A1,1 | P1,2 A1,2 | P1,3 A1,3 | ...... | P1,N A1,N |
|---|---|---|---|---|
| P2,1 A2,1 | P2,2 A2,2 | P2,3 A2,3 | ...... | P2,N A2,N |
| ⋮ | ⋮ | ⋮ | | ⋮ |
| PM,1 AM,1 | PM,2 AM,2 | PM,3 AM,3 | ...... | PM,N AM,N |

FIG. 4b

| B1,1 AM,1 | ...... | B1,M A2,1 | B1,M A1,1 |
|---|---|---|---|
| B2,1 AM,2 | ...... | B2,M-1 A2,2 | B2,M A1,1 |
| B3,1 AM,3 | ...... | B3,M-1 A2,3 | B3,M A1,3 |
| ⋮ | | ⋮ | ⋮ |
| BN,1 AM,N | ...... | BN,M-1 A2,N | BN,M A1,N |

FIG. 4c

| P1,1 AM,N | ...... | P1,N-2 AM,3 | P1,N-1 AM,2 | P1,N AM,1 |
|---|---|---|---|---|
| ⋮ | | ⋮ | ⋮ | ⋮ |
| PM-1,1 A2,N | ...... | PM-1,N-2 A2,3 | PM-1,N-1 A2,2 | PM-1,N A2,1 |
| PM,1 A1,N | ...... | PM,N-2 A1,3 | PM,N-1 A1,2 | PM,N A1,1 |

FIG. 4d

| B1,1 A1,N | B1,2 A2,N | ...... | B1,M AM,N |
|---|---|---|---|
| ⋮ | ⋮ | | ⋮ |
| BN-2,1 A1,3 | BN-2,2 A2,3 | ...... | BN-2,M AM,3 |
| BN-1,1 A1,2 | BN-1,2 A2,2 | ...... | BN-1,M AM,2 |
| BN,1 A1,1 | BN,2 A2,1 | ...... | BN,M AM,1 |

VIDEO GRAPHIC INTERFACE DEVICE AND METHOD FOR PORTRAIT AND LANDSCAPE IMAGE DISPLAY MODES

The present invention relates to video graphic interface devices and methods which support multi-mode video displays of data so that a displayed image can be reoriented, such as from a landscape to a portrait displayed image, thereby permitting the physical reorientation of the display device while maintaining the image upright.

BACKGROUND

Computer systems having graphic video displays are well known in the art. Typically graphic interface devices use a signal which is rastered onto the display in multiple rows of pixels to produce a desired video image. By industry convention, a number of standardized resolution pixel display modes have developed. For example, one common resolution mode is to define a video image with 600 rows of pixels, each row having 800 pixels, thus providing 800×600 resolution. A common higher resolution display mode provides 768 rows of pixels where each row has 1,024 pixels, thus, 1024×768 resolution. Other common resolution modes range from 640×480 pixels to 1280×1024 pixels.

Most commonly, the physical display to which the video interface device is connected is horizontally oriented so that an upright displayed image is in a landscape orientation. However, from time to time, it may be desirable to orient the physical display in a sideways portrait orientation or even upside down from the normal landscape orientation. When a display is turned sideways, i.e. 90°, the normal landscape displayed image also appears sideways. In order for the image to appear upright when a typical physical display is oriented sideways, the image can be displayed in a portrait orientation. Thus, in a portrait orientation, a normal 800×600 display will appear as a 600×800 image.

While it is possible to construct a special display device which changes the image orientation of a display image in the display device to accommodate a change in the display's physical orientation, it is desirable to be able to merely reorient the data which define the pixels of the video image. Accordingly, it is desirable to provide a video interface device that can change the orientation of a displayed image when the display is physically orientated in other than its normal horizontal orientation.

SUMMARY

The present invention provides a graphic interface device for producing a video signal for a display such that the user may select between landscape and portrait image display modes. The graphic interface device has a pixel data memory array from which a video output signal is derived. A primary graphics engine renders graphics in a landscape orientation in conjunction with a frame buffer. The primary landscape graphics engine stores rendered graphics to the pixel data memory array and also copies selected graphics in data blocks within the frame buffer called surfaces. To provide quick changes to the pixel data memory array, the primary graphics engine may recall a selected surface from the frame buffer, make any required change to the surface to produce the desired graphic, then store the changed data to both the pixel data memory array as well as the frame buffer.

In order to provide other display modes to display images in different physical orientations, a mode control is provided in conjunction with a rotated pixel data array buffer to facilitate the rendering of portrait oriented graphics by the primary landscape graphics engine. In addition, to facilitate the efficiency and speed of rendering portrait oriented graphics, a secondary portrait graphics engine is provided.

For some applications, such as where the user's display is more frequently in a portrait orientation, the primary graphics engine can be configured to operate to render portrait oriented graphics and the secondary graphics engine is provided to render landscape oriented graphics. For convenience, the invention is described herein with a primary landscape engine.

Unlike the primary landscape engine, the secondary portrait engine need not be configured to render extensive pixel by pixel graphic images, but can be limited in nature to rendering graphics which may be reproduced from coordinate data such as uniform coloring of a rectangle or rendering specific types of graphics which are repetitively called for when operating in portrait mode. To enable the secondary portrait graphics engine to access the frame buffer directly, a rotated surface buffer is used by the primary landscape engine to indirectly store copies of data written to the rotated data array buffer in the frame buffer in a portrait orientation.

In addition to physical memory contained within the graphic interface device, the graphic engine may also have access to other memory within the computer system which it can utilize to temporarily store graphic data in rotated or unrotated formats. Accordingly, the entirety of the rotated surface buffer may be implemented in system memory.

When landscape mode is selected, the landscape engine renders the graphics for display in its normal manner. However, when portrait mode is selected, the mode control can choose between either using the portrait engine to render graphics or the landscape engine.

The secondary portrait engine directly renders graphics to the pixel data memory array in portrait mode. Where the landscape engine is selected, however, the data flow is switched by the mode control from a direct route from the landscape engine to the pixel data memory array to an indirect route via a rotated pixel data array buffer. In portrait mode, the landscape engine renders its graphics and writes to the pixel data array buffer which, in turn, rotates the data positioning and places it in the pixel data memory array. Concurrently therewith, the landscape engine accesses the frame buffer via the rotated surface buffer so that the rendered graphics which are written by the landscape engine to the rotated pixel data array buffer are also written to the rotated surface buffer whereupon they are saved in the frame buffer in a rotated, portrait orientation. This storage of rotated surfaces within the frame buffer permits the portrait engine to directly access the frame buffer with respect to those surfaces so that the portrait engine may utilize such saved surfaces in rendering direct portrait graphics when in the portrait mode.

Where a revised or new portrait oriented surface is to be displayed, the mode control selects between use of the portrait engine or the landscape engine dependent upon the type of graphic renderings which must be made. To the extent the more limited secondary portrait engine is capable of performing the required task, it is selected. When selected, the secondary portrait engine retrieves, if needed, a stored surface from the frame buffer, performs the required graphic renderings, stores the revised or new surface in the pixel data memory array to display the revised or new image, and can also copy the revised or new portrait oriented data into a frame buffer surface or into other available system memory. Where the portrait engine cannot perform the required task, the mode control selects the landscape engine. Upon selection, the primary landscape engine retrieves, if needed, a stored surface from the frame buffer or the rotated surface buffer, performs the required graphic renderings, and writes the revised or new surface to the rotated pixel data array buffer and the rotated surface buffer. The revised or new surface is then rotated and stored in the pixel data memory array and saved in the frame buffer in a portrait orientation via the rotated surface buffer.

The mode control may also implement an inversion function to provide inverted landscape and/or portrait video images. The inversion function permits the interface device to provide an inverted, or upside down, landscape video image which will appear upright if the physical display is rotated 180°. For portrait mode, if a displayed image appears upright when the normal landscape physical display is rotated 90°, the inverted portrait display will appear upright when the normally landscape display is rotated 270°. Where the video image is an M×N pixel array, the mode control simply stores any data intended for pixel $P_{i,j}$ at pixel $P_{M+1-I, N+1-J}$. The same function is equally useable when operated in portrait mode to produce an inverted portrait image for an N×M pixel display image.

It is an object of the present invention to provide an efficient video interface device capable of multi-mode video image orientation displays. Providing rotated buffers for utilizing a primary landscape engine to produce and store portrait oriented images in combination with a secondary portrait engine provides a highly efficient and fast method of rendering portrait images in a graphic interface device which is designed for normal landscape displays.

BRIEF DESCRIPTION OF THE DRAWINGS

The above, as well as other objects of the present invention, will become apparent when reading the accompanying description and drawings in which:

FIGS. 4a–4d are schematic diagrams of the pixel array data locations produced in four different modes during operation of the video graphic interface device in accordance with the present invention.

DESCRIPTION OF THE PREFERRED EMBODIMENTS

Figure 1:
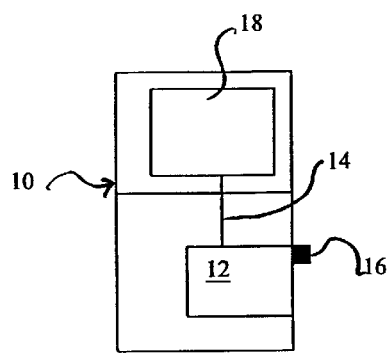
FIG. 1 is a schematic diagram of a computer system incorporating a video interface device in accordance with the teachings of the present invention.

Referring to FIG. 1, there is shown a computer system 10 having a video graphic interface device 12 which outputs a video signal via either an internal video output 14 or a video output port 16, or both. The computer system 10 may optionally include an onboard display device 18 or a peripheral display device such as a monitor 19, shown in FIG. 2. Where a peripheral display device 19 is utilized, the display device 19 is connected to the computer system 10 via the video output port 16 using a cable or the like.

Figure 2A:
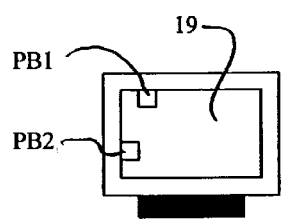
FIGS. 2a–2d are schematic diagrams of various physical orientations of a monitor on which an upright video image may be displayed by a video interface device in accordance with the teachings of the present invention.
Figure 2B:
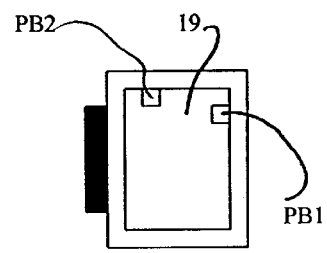
Figure 2C:
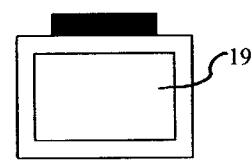
Figure 2D:
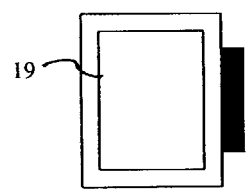

In normal operation of the computer system, the on-board display 18 or peripheral display 19 is oriented in a landscape orientation as shown in FIGS. 1 and 2a. However, from time to time, it may be desirable to reorient the position of the display device such as is illustrated for display device 19 in FIGS. 2b–2d. FIG. 2b illustrates a 90° rotation from normal which results in a portrait orientation of the display. FIG. 2c illustrates an inverted landscape orientation, i.e. 180° from normal. FIG. 2d illustrates an inverted portrait orientation, i.e. 270° from normal. In order to accommodate a physical change in orientation of the display device 18, 19, the graphic interface device 12 is capable of multi-mode operation so that an upright image can be displayed irrespective of the physical orientation of the display device 18, 19.

Figure 3:
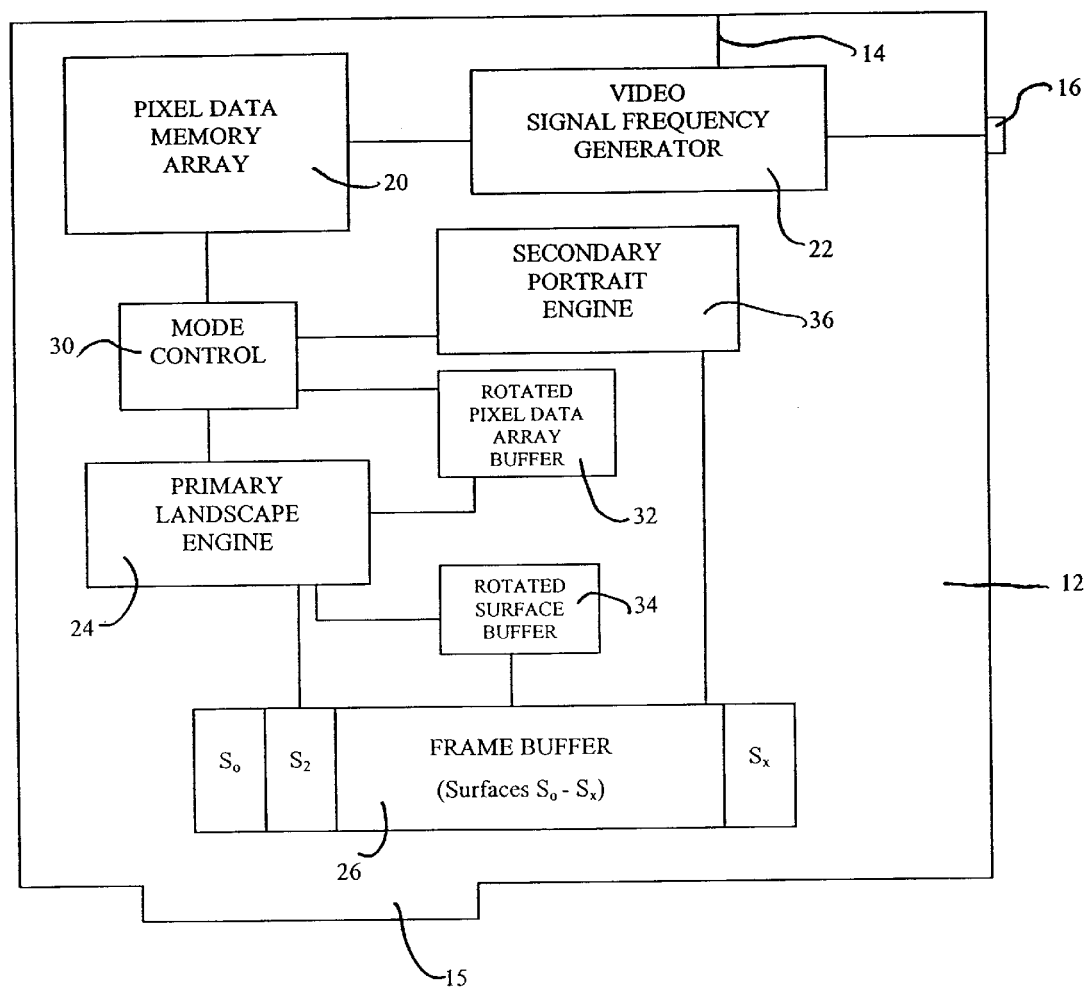
FIG. 3 is a schematic diagram of an add-in card embodiment of a video graphic interface device made in accordance with the teachings of the present invention.

As shown in FIG. 3, the video graphic interface device 12 can be incorporated into an add-in card embodiment having a card edge contact area 15 which mates with an edge card connector of a motherboard of the computer system 10. In the add-in card embodiment shown in FIG. 3, the graphic interface card has a video output port 16 and may optionally have a direct video output 14 for connection with an onboard display 18.

The video interface device 12 includes a pixel data memory array 20 and an associated video signal frequency generator 22. The pixel data memory array stores data for each pixel which is to form a displayed video image. The video signal frequency generator 22 generates a signal having appropriate frequency for the display device which is coupled to the video interface device 12 via a conventional rastering operation based on the data currently stored in the pixel data memory array 20.

FIG. 4a illustrates the data in the pixel data memory array 20 where a video image having M×N resolution is being displayed. The data for the upper lefthandmost pixel P1, 1 in the video display is represented by A1,1; the data for the lower right most pixel PM,N of the video display is represented by AM,N. Preferably, M and N are selected to match a commonly used video image resolution such as 800×600 or 1024×768. In the first case, M equals 800 and N equals 600; in the second case, M equals 1024 and N equals 768. However, as will be recognized by those of ordinary skill in the art, M and N may have any values which a display device permits including cases where M=N and M<N.

A primary graphics engine 24 and an associated frame buffer 26 are provided for rendering normal landscape oriented graphics. The primary engine 24 is capable of writing data to each and every address in the pixel data memory array from A1,1 through AM,N. In some instances, the landscape engine may perform an operation to write to all pixel data addresses, such as to initialize a display by setting all pixels to display the color white at the same intensity. With such an operation, reference to the frame buffer 26 is not required.

For increased speed and efficiency, the primary graphics engine can sequentially render graphics for small rectangles within the pixel data memory array 22 instead of writing to the entire M×N array. Often operations require the landscape engine to display typewritten letters in a selected area of a video image. In conjunction with writing data to represent typewritten letters in such an area, the landscape engine 24 can use the frame buffer 26. The frame buffer 26 stores a variety of information in blocks of memory addresses commonly called surfaces $S_o \ldots S_x$. One surface may include data relating to fonts. For example, an upper left area represented in the video image by the data stored in a rectangular pixel box PB1 having corner pixels corresponding to P1,2; P1,9; P7,2 and P7,9, may require words to be displayed.

In writing to the pixel data memory array to produce the word images in pixel box PB1, data is written to the corresponding data points in the rectangle of data points having corners A1,2; A1,9; A7,2 and A7,9. In conjunction with rendering the graphics data to the pixel data memory array 20, the landscape engine 24 retrieves font information from the font surface in frame buffer 26 and assigns appropriate data to each of the data point addresses in the data rectangle having corners A1,2; A1,9; A7,2 and A7,9. The landscape engine 24 can also store a copy of the rendered graphics in a separate surface in the frame buffer 26 so that it can be quickly called upon to make revisions to that specific rectangle within the pixel data memory array 20 in the future.

While it is possible to design a primary landscape engine to always render pixel by pixel graphics, it is much more efficient to recall stored images from the frame buffer 26 and do minor revisions, then it is to render graphics on a pixel by pixel basis. The above example, with regards to displaying letters is illustrative. There, the frame buffer 26 stores a variety of fonts and the landscape engine merely retrieves the information to graphically represent words in a selected font and places the appropriate prearranged data for the letters in the appropriate locations of the pixel data memory array. Retrieving stored font data is much easier than requiring the primary graphics engine 24 to render graphics for each required letter.

Since the graphics for fonts are generally stored in an upright orientation, however, the primary landscape engine 24 cannot use such stored fonts to render sideways letters which are needed if the letters are to appear upright when the display device 19 is rotated 90°; such as illustrated in FIG. 2b. In order for the landscape engine 24 to utilize, for example, the upright font information stored in the frame buffer 26 to produce letters which will be in an upright orientation when the display is in a portrait orientation shown in FIG. 2b, a mode control 30 and rotated pixel data array buffer 32 are provided.

When the video image is to have a portrait orientation to accommodate the physical reorientation of the monitor 19 from horizontal, FIG. 2a, to the orientation illustrated in FIG. 2b, the mode control 30 switches from direct access by the landscape engine 24 to the pixel data memory array 20 to indirect access via rotated pixel data array buffer 32. The rotated pixel data array buffer 32 presents up to an N×M array of data to which the primary landscape engine 24 can write information. The rotated pixel data array buffer 32 presents to the landscape engine 24 data locations B1,1 through BN,M as illustrated in FIG. 4b. For speed and convenience, the same small rectangles use for normal landscape operations can be used, but are presented in a portrait orientation to the primary landscape engine 24 by the rotated pixel data buffer 32.

After the landscape engine 24 writes to the rotated pixel data array buffer 32, the rotated pixel data array buffer 32 then copies the data to the pixel data memory array 20 in locations corresponding to the locations indicated in FIG. 4b with respect to the FIG. 4a locations. Accordingly, the data written to B 11 in rotated pixel data array buffer 32 is copied to AM,1 in the pixel data memory array 20. Similarly, pixel data memory array 20 receives a copy of the data written to B1,M in data location A1,1.

In order to display the typewritten words of the prior examples in the pixel box PB1 corners, P1,2; P1,9; P7,2 and P7,9 for landscape mode in roughly the same upper left location in portrait mode, the data needs to be displayed in a portrait orientation in pixel box PB2 having corner pixels PM-1,1; PM-10,1; PM-1,7 and PM-10,7. Thus, data is written to the rotated pixel data array buffer 32 by the landscape engine 24, utilizing font information from frame buffer 26, to the data locations within data rectangle having corners B1,2; B1,9; B7,2 and B7,9 of the rotated pixel array buffer 32. The data is then copied to the pixel data memory array 20 at the data locations within the data rectangle having corners AM-1,1; AM-10,1; AM-1,7 and AM-10,7. Accordingly, the original words which appeared upright in the normal landscape orientation when written to pixel box PB1 of FIG. 2a, will again appear upright in the display 19 in the orientation shown in FIG. 2b in pixel box PB2 when displaying the portrait mode video image.

To facilitate revisions in portrait mode, a rotated surface buffer 34 is provided to which the landscape engine 24 copies the pixel data which it writes to rotated pixel data array buffer 32. The rotated surface array buffer 34 converts the data in the same manner as the rotated pixel data array buffer 34 does with respect to the pixel data memory array 20 when the pixel surface buffer 34 stores the copied information into the frame buffer 26. The storage of rotated surfaces in the frame buffer 26 permits the efficient use of a secondary portrait graphics engine 36 which can directly use the rotated surfaces stored in the frame buffer 26 for making revisions to the pixel data memory array 20 while the graphic interface device 12 is operated in portrait mode.

In addition to physical memory contained within the graphic interface device, the graphic engine may also have access to other memory within the computer system which it can utilize to temporarily store graphic data in rotated or unrotated formats. Accordingly, for example, the entirety of the rotated surface buffer 34 may be implemented in system memory.

The secondary portrait graphics engine 26 need not be as extensive nor have extensive associated reference surfaces, such as complete font data, stored in the frame buffer 26 as does the landscape engine 24. The portrait engine 26 can be designed to directly render simple tasks such as filling in a predetermined rectangle with a solid color which does not involve individual pixel by pixel data generation or reference to the frame buffer 26. The portrait engine 36 can also perform relatively simple tasks to those portions of the pixel data memory array 20 copied and stored in a rotated portrait orientation via rotated surface buffer 34 in the frame buffer 26.

If the portrait engine 36 cannot perform the specific task required in portrait mode, the primary landscape graphics engine 24 performs the task via the rotated pixel data array buffer 32 as explained above. Because the portrait engine 36 directly accesses the pixel data memory array 20 and the rotated surfaces stored in the frame buffer 26, it is generally faster than rendering the same graphics through the landscape engine 24. However, more complicated graphics can be diverted to the primary landscape graphics engine 24 via rotated pixel data array buffer 32 so that the portrait graphics engine 36 need not incorporate a more sophisticated and/or additional processor in the graphic interface device 12. In instances where a relatively complicated task is repetitively required to be performed, such a task can be implemented in the secondary engine 36. By assigning easy and repetitive tasks to the portrait graphics engine 36, a significant acceleration of graphic renderings can be achieved without undue costs which would be required for providing a secondary portrait engine 36 having the same capability as the primary landscape engine 24.

Figure 5:
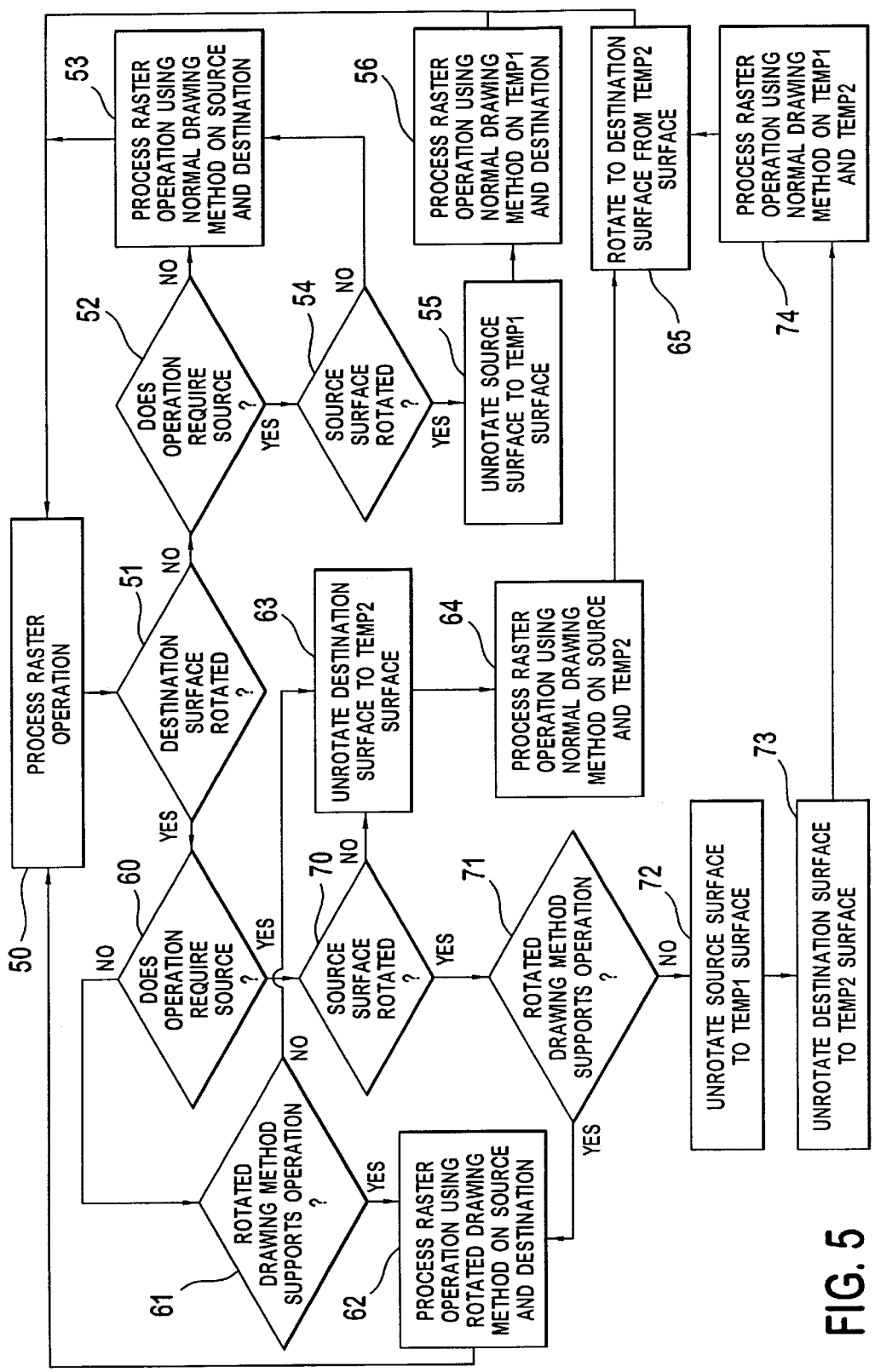
FIG. 5 is a flow chart of the methodology implemented in a video graphic interface device made in accordance with the present invention.

The general operation of the video interface device 12 is shown with reference to the flow chart depicted in FIG. 5. In general, there is a continuing raster processing operation 50 being conducted by video signal frequency generator 22 with respect to the data stored in the pixel data memory array 20. When a change in the display is initiated by the computer for a selected rectangle of pixels, a first decision, represented by box 51, is made dependant on whether the display image is being produced in landscape mode or in portrait mode.

If in normal landscape mode, a next decision is made, represented by box 52, wherein the landscape engine decides whether or not source information is required from the frame buffer 26. If it is not, the landscape engine 24 renders the required graphics for the revisions and stores them to the pixel data memory array 20 as indicated in box 53. In conjunction therewith, the landscape engine also copies the material written to the pixel data memory array 20 to a surface in the frame buffer 26 for later use. If the normal landscape graphics operation requires the primary landscape engine 24 to access the frame buffer 26 per decision box 52, then it is determined, as reflected in decision box 54, whether or not the information to be accessed is stored in a portrait orientation. If it is not, the primary graphics engine 24 continues with normal processing as reflected in box 53. If the reference material has previously been stored in a portrait orientation, the reference material is copied from the frame buffer 26 to the rotated surface buffer 34 as indicated in box 55. Thereafter the primary landscape engine 24 utilizes the source data as stored in rotated surface buffer 34 to produce the revised image data which is stored directly to pixel data memory array 20 as indicated by box 56.

Where the decision from box 51 is that portrait mode is enabled, a decision is also made, represented by box 60, whether the revised display requires access to source material stored in the frame buffer 26. If it does not, the mode control 30, at box 61, determines whether or not the operation is one that can be performed by the secondary portrait engine 36. If so, the portrait engine 36 is assigned the task and renders the graphics for the pixel data memory array 20 directly and, preferably, also stores the rendered graphics in the portrait orientation in the frame buffer 26 as represented by box 62.

If at decision 61, the mode control 30 determines that the operation is not suitable for the secondary portrait engine 36, it initializes the rotated pixel data array buffer 32 by copying the data of the portion of the pixel data memory array 20 which is to be revised to the rotated pixel data array buffer 32 as represented by box 63. Since no source is required, the primary landscape graphics engine 24 revises the data in rotated pixel data array buffer 32 and, preferably, also copies the data into a surface of frame buffer 26 as indicated by box 64. Thereafter the revised data in rotated pixel data array buffer 32 is copied back to pixel data memory array 20 via the unrotation mapping reflected in FIG. 4b as indicated in box 65.

If in portrait mode operation source data from frame buffer 26 is required as indicated at box 60, a determination of whether the required source surface data is in portrait orientation is made, as represented by box 70. If the surface data in buffer 26 is not in portrait mode, the portrait engine 36 cannot be utilized so processing continues as set forth above with reference to boxes 63, 64 and 65.

If in portrait mode, required surface data is stored in the frame buffer 26 in a portrait orientation, a determination is then made, represented by box 71, whether or not the operation to be performed can be performed by the secondary portrait graphics engine 36. If it can be, the mode control 30 selects the portrait graphics engine 36 to process the information using the information stored in portrait orientation in the frame buffer 26 as explained above in conjunction with box 62. If the portrait engine 36 cannot be used, the mode control 30 copies the portion of the pixel data memory array 20 which is to be revised into the rotated pixel data array buffer 32 in accordance with the mapping of FIG. 4b as indicated by box 72. Additionally, the source material from frame buffer 26 is likewise copied into the rotated surface buffer 34 in accordance with the mapping illustrated in FIG. 4b as represented by box 73. The primary landscape graphics engine 24 then performs the graphics rendering to make the data revisions to the rotated pixel data array buffer 32 using the material in the rotated surface buffer 34 as indicated by box 74. Thereafter, the rotated pixel data array buffer 32 data is copied to the pixel data memory array 20 in accordance with the mapping of FIG. 4b as represented by box 65.

Two additional modes of operation are preferably implemented to provide upright video images when the display 19 is oriented in either an inverted landscape position illustrated in FIG. 2c or an inverted portrait position illustrated in FIG. 2d. For the inverted modes, the mode control 30 utilizes an inversion function with respect to all data transferred to the pixel data memory array 20. To produce the inverted landscape image for an upright displayed image where the display is oriented as depicted in FIG. 2c, the video graphics interface device 12 operates in its normal landscape mode, but all data addresses for the pixel data memory array are subjected to an inversion function by the mode control 30.

Specifically, all data for the pixel data memory array, when containing an M×N array of data, sent to address AI,J is stored at address AM+1-I,N+1-J. This creates the mapping of each of the addresses A1,1 through AM,N represented in FIG. 4a to the corresponding locations represented in FIG. 4c. Thus, the video image which would appear upright through normal landscape mode will appear inverted by the mode control applying the inversion function in landscape mode. Similarly applying the same inversion function while operating in the portrait mode as described above produces the mapping represented by FIG. 4d. The inversion operation, accordingly, generally operates to provide inverted landscape and inverted portrait modes by assigning data for each pixel $P_{I,J}$ within the M×N array of pixels $P_{1,1}$ through $P_{M,N}$ to pixel $P_{M+1-I,\ N+1-J}$.

It will be recognized to those of ordinary skill in the art that an M×N pixel array can be defined utilizing pixel identification $P_{0,0}$ through $P_{M-1,N-1}$ In such case the inversion operation assigns data for $P_{I,J}$ to $P_{M-I,\ N-J}$.

Although four particular modes have been described, those of ordinary skill in the art will recognize the applicability of the described graphic interface device to produce other modes in accordance with the teachings of the present invention.

While a specific embodiment of the present invention has been shown and described, many modifications and variations can be made by one skilled in the art without departing from the spirit and scope of the invention. The above description serves to illustrate and not limit the particular form in any way.

What is claimed is:

1. A graphic interface device comprising:
   a pixel memory array from which a video output signal is derived;
   a landscape graphics engine for rendering graphics in a landscape orientation;
   a portrait graphics engine for rendering graphics in a portrait orientation;

a frame buffer associated with said graphics engines for storing arrays of data for use by said graphics engines in rendering graphics;

at least said landscape graphics engine selectively storing copies of rendered graphics in said frame buffer;

a mode control coupled to (i) the pixel memory array via a first selectable path, (ii) the landscape graphics engine via a second selectable path, and (iii) the portrait graphics engine via a third selectable path, the mode control for controlling the type of graphics rendering dependent upon the desired orientation for data stored in the pixel memory array, such that said mode control:

in a first mode, permits direct graphics rendering by said landscape graphics engine; and in a second mode, selects between direct graphics rendering by said portrait graphics engine or graphics rendering by said landscape engine via a rotated pixel array buffer coupled to the mode control via a fourth selectable path; and a rotated surface buffer for facilitating storage of graphics rendered by said landscape engine in said second mode in said frame buffer in a portrait orientation whereby portrait oriented data can be accessed by said portrait engine directly and by said landscape engine via said rotated surface buffer from said frame buffer to facilitate graphics rendering.

2. A graphic interface device according to claim 1 wherein said portrait graphics engine has a subset of the capabilities of said landscape graphics engine and said mode control selects direct rendering of graphics by said portrait graphics engine when said portrait graphics engine is capable of an operation to be implemented in said second mode.

3. A graphic interface device according to claim 2 wherein said mode control implements a pixel data inversion function for an M×N pixel memory array to provide inverted landscape and inverted portrait modes by assigning data for each pixel $P_{I,J}$ within the M×N array to pixel $P_{M+1-I, N+1-J}$.

4. A graphic interface device comprising:

a pixel memory array from which a video output signal is derived;

a primary graphics engine for rendering graphics in a primary orientation;

a secondary graphics engine for rendering graphics in a secondary orientation;

a frame buffer associated with said graphics engines for storing arrays of data for use by said graphics engines in rendering graphics;

at least said primary graphics engine selectively storing copies of rendered graphics in said frame buffer;

a mode control coupled to (i) the pixel memory array via a first selectable path, (ii) the primary graphics engine via a second selectable path, and (iii) the secondary graphics engine via a third selectable path, the mode control for controlling the type of graphics rendering dependent upon the desired orientation for data stored in the pixel memory array, such that said mode control:

in a first mode, permits direct graphics rendering by said primary graphics engine; and in a second mode, selects between direct graphics rendering by said secondary graphics engine or graphics rendering by said primary engine via a rotated pixel array buffer coupled to the mode control via a fourth selectable path; and a rotated surface buffer for facilitating storage of graphics rendered by said primary engine in said second mode in said frame buffer in said secondary orientation whereby secondary oriented data can be accessed by said secondary engine directly and by said primary engine via said rotated surface buffer from said frame buffer to facilitate graphics rendering.

5. A graphic interface device according to claim 4 wherein said secondary graphics engine has a subset of the capabilities of said primary graphics engine and said mode control selects direct rendering of graphics by said secondary graphics engine when said secondary graphics engine is capable of an operation to be implemented in said second mode.

6. A graphic interface device according to claim 5 wherein said mode control implements a pixel data inversion function for an M×N pixel memory array to provide inverted primary and inverted secondary modes by assigning data for pixel $P_{I,J}$ of the M×N array to pixel $P_{M+1-I, N+1-J}$.

7. In a graphic interface device including (i) a pixel memory array, (ii) a primary graphics engine, (iii) a secondary graphics engine, and (iv) a mode control coupled to the pixel memory array via a first selectable path, the primary graphics engine via a second selectable path, and the secondary graphics engine via a third selectable path, a method for producing a selectively oriented video image produced from a video signal which is derived from data stored in the pixel memory array comprising:

a) selecting at least a portion of the pixel memory array for storing new display data;

b) determining whether the new display data is to be oriented in a first or second display orientation;

c) where the new display data is to be displayed in the first orientation, using the primary graphics engine to produce the new display data and storing the new display data to the selected portion of the pixel memory array;

d) where new display data is to be oriented in the second orientation, using the mode control to select between:

i) producing the new display data via the secondary graphics engine and storing the new display data to said selected portion of the pixel memory array, or ii) reorienting all previously stored data in said selected portion, processing said reoriented data by said primary graphics engine for producing display data having said first orientation, reorienting the display data to said second orientation, and storing the reoriented display data to said selected portion of the pixel memory array.

8. A method according to claim 7 further comprising said primary graphics engine storing copies of the new display data to a frame buffer either directly in said first orientation or via a rotated surface buffer in said second orientation whereby said secondary graphics engine can use data stored in said frame buffer in said second orientation for producing revised data in said second orientation.

9. A method according to claim 8 wherein said secondary graphics engine has a subset of the capabilities of said primary graphics engine such that the production of the new display data oriented in said second orientation is performed by said second graphics engine if it is capable, otherwise production is done by said primary graphics engine.

10. A method according to claim 7 further comprising third and fourth modes of operation to produce inverted first orientation and inverted second orientation images by rerouting data for an M×N pixel memory array by assigning data for pixel $P_{I,J}$ to pixel $P_{M+1-I, N+1-J}$.

11. A method according to claim 7 wherein the pixel memory array represents a rectangle of M×N pixels where M>N, said first display orientation is a landscape orientation and said second display orientation is a portrait orientation.

* * * * *